Jan. 18, 1938.  J. F. GUEST  2,106,027
RIFFLE
Filed Aug. 7, 1936   2 Sheets-Sheet 2
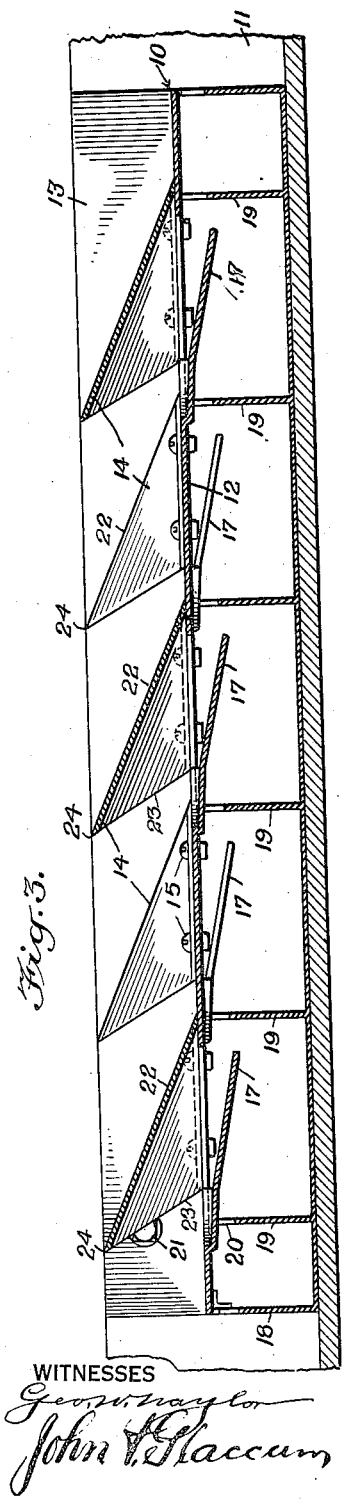
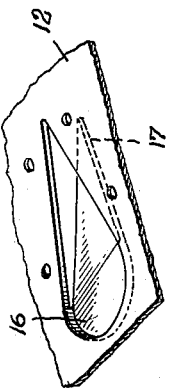
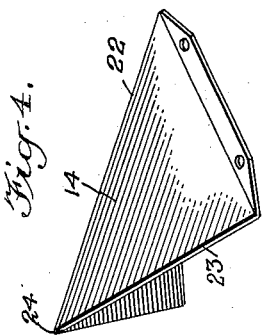
WITNESSES
INVENTOR
John F. Guest
BY
ATTORNEYS Patented Jan. 18, 1938

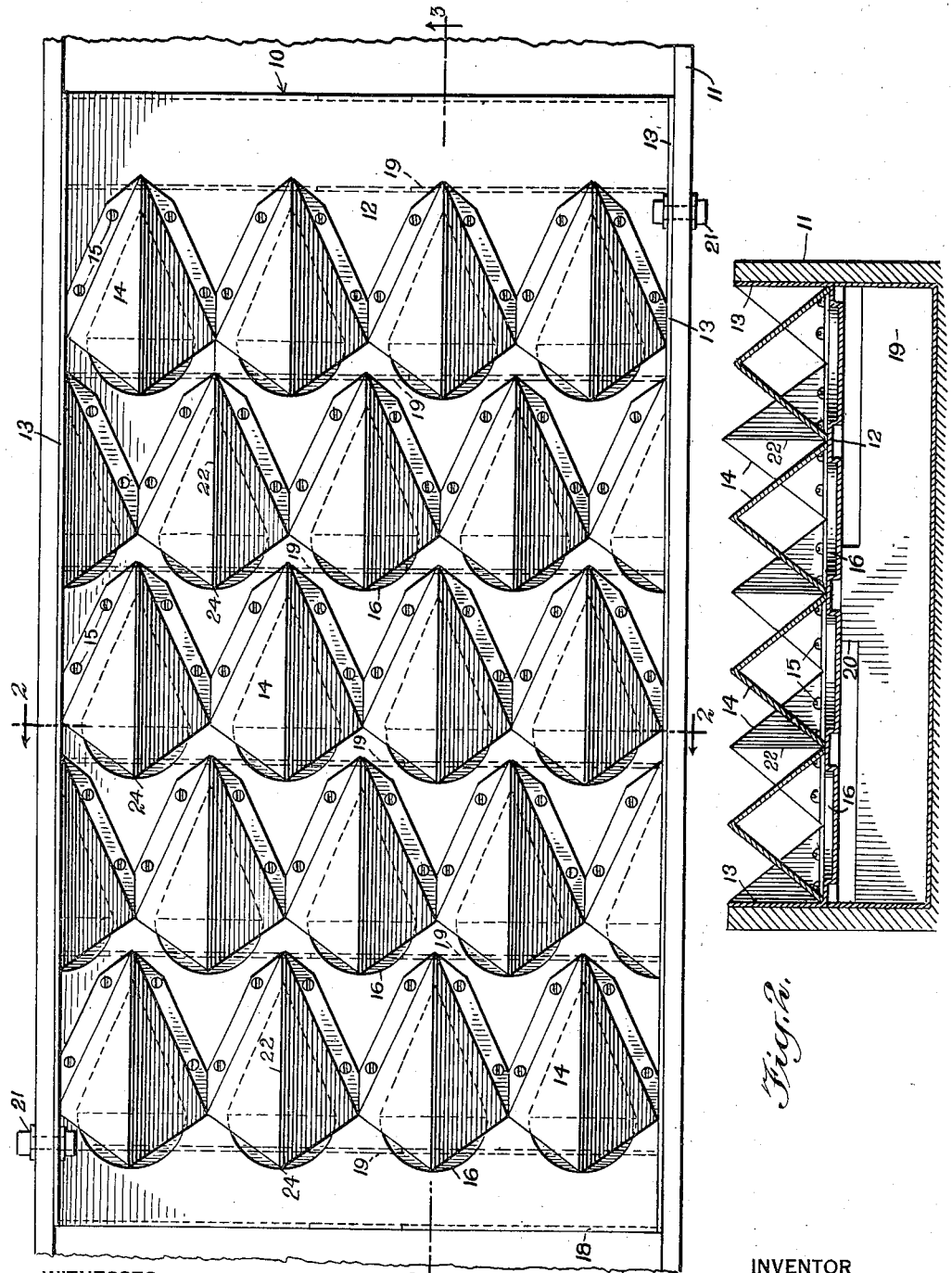

2,106,027

UNITED STATES PATENT OFFICE 2,106,027

RIFFLE

John F. Guest, Kelowna, British Columbia, Canada, assignor of one-half to Joseph L. Rosenberg, New York, N. Y.

Application August 7, 1936, Serial No. 94,769

10 Claims. (Cl. 209—458)

This invention relates to mining equipment, and more particularly to equipment used in placer mining commonly known as riffles or classifiers.

An object of the invention is to provide a device which will more efficiently separate gold and other mineral bearing materials from the sand, gravel and similar substances in which they are found.

Another object of the invention is to provide a device which is economical in construction, compact in structure and which is adapted for use with various types of gangue.

Various types of machinery and riffles have been used in the past in the placer mining industry to separate the gold-bearing materials from the gravel, clay and sand in which it is found. Complicated machines having vibrators and other types of riffles have been used. However, none of the devices now in use are efficient in their operation and with all of them work must be suspended whenever the payload is to be removed.

A further object of the present invention is to provide a device of the character described which will prevent thieves or dishonest workmen from removing the gold-bearing materials and which will allow the collection of such materials without discontinuing the run.

In the accompanying drawings,

Figure 1 is a plan view of a section of my improved riffle,

Figure 2 is a cross-sectional view of the riffle taken on the line 2—2 of Figure 1, Figure 3 is a cross-sectional view taken on the line 3—3 of Figure 1, Figure 4 is a detailed view of the cap, and Figure 5 is a sectional view of the floor illustrating the trap or lip.

As will be seen by referring to the drawings, Figure 1 shows my device 10 positioned in a sluice-box 11. The device may be made in sections of any convenient length, but I have found that sections of approximately four feet are more easily handled. The device 10 is pan-shaped and is provided with a floor 12 and walls 13. On the floor 12 are bolted a series of triangular caps 14 by means of the bolts 15. While I have shown the bolts 15, it will be appreciated that any other fastening means may be used and, in fact, the caps 14 may be welded if so desired. The caps 14 are set in alternate rows in staggered relation and with their pointed ends on the downstream side. Immediately below the caps 14 the floor 12 is depressed to form tables 16, which I have shown as semi-circular in shape, although they may be of any other shape. The floor immediately behind the table 16 is cut through and bent downwardly to form a lip or trap 17. Below the floor 12 there is a second pan 18. This second pan supports the floor 12 and is provided with a series of baffles 19 situated one below each triangular cap. The baffles 19 have a raised section 20 which in turn supports the floor 12.

In operation, the pan 18 is placed in the sluicebox and the riffle 10 is placed on top of it. The wall 13 of the riffle is provided with a hole 21 through which a bolt may be run through the wall of the sluice-box. A padlock may be placed on the end of this bolt in order to prevent the removal of the pan and to hold it securely in the box.

In the operation of the device, the gangue or run is set into the sluice over the riffle 10. The triangular caps 14 are provided with a sharp back 22 and the forward edges 23 are likewise sharp. The peak 24 is pointed. The gangue, when thrown by the force of the water against the sharp backs 22, is broken down and the forward edges 23 of the peaks 24 cut up the clay and break down the gangue, thus freeing the sand and gravel from the clay or other materials. The backs 22, the edges 23 and the points 24 thus produce a sawing effect as the gangue is forced over and around them. Due to the shape of the triangular caps, a cutting edge of approximately twice the width of the riffle is provided. I have found that the best results are secured by tilting the sluice one inch to the foot, although the angle may be varied in accordance with the type of gangue to be worked. The caps 14 are staggered so that the water carrying the gangue is thrown from side to side and the gangue will be broken down. The staggering of the caps 14 produces whirlpools and backeddies behind the open side of the caps and the gold-bearing materials, having been shaken and washed loose from the gravel, settle upon the tables 16 and are washed through the trap 17 against the baffles 19. The baffles 19 still the water to some extent and allow the heavy goldbearing materials to settle against the upstream side of the baffles, the water and any light sand that remains passing out over the baffles.

When it is desired to collect and clean the load, the riffle 10 may be unlocked and lifted out of the sluicebox and a new pan substituted for the pan 18. It will be seen that in this manner considerable time is saved and that the device is not put out of operation for long periods of time when it is necessary to collect the gold-bearing material. Moreover, dishonest workmen cannot reach the material in the pan 18 and the entire device may be left without a watchman.

It will be understood that the caps 14 may be varied in size, shape and weight in accordance with the type of material that is found in the particular locality in which the device is to be used. Other obvious variations may be made to suit varying conditions and materials. It will be further understood that, while throughout the specification I have referred to my device as being used for mining gold, it is equally adaptable in the mining of all metals.

I claim:

1. A riffle or classifier comprising a receiving pan, baffles in said pan, a floor situated above said pan, said floor being provided with a series of offset peaked members having triangular shaped sides open at their down-stream side, and means under said projections communicating with the receiving pan.

2. A riffle or classifier comprising a receiving pan, a floor above said pan, triangular sided peaked members, on said floor, said members being open on their downstream sides, tables, and traps under said members, said traps communicating with said receiving pan.

3. In a device of the character described, a pan, baffles situated in said pan, a floor above said pan, depressed tables in said floor, traps communicating with said tables and said pan, and triangular sided peaked members open at their downstream sides on said floor, over said tables and traps.

4. A riffle or classifier comprising a floor, semi-circular tables depressed in said floor, traps extending from the straight edge of said tables through said floor, and triangular sided, peaked shaded caps over said tables, said caps being sharp at their open end.

5. In a device of the character described, a floor, depressed tables in said floor, traps communicating with said tables through said floor, peaked members having triangular-shaped sides open at their down stream sides on said floor extending over said tables, said peaked members being sharp at the open edges and back thereof.

6. In a device of the character described, a pan, baffles situated in said pan, a floor above said pan, and a plurality of rows of triangular-sided, peaked members, each of said rows being in staggered relation with the adjoining row, and said peaked members being open at their down-stream side, traps under said peaked members communicating with said pan.

7. In a device of the character described, a floor, depressed tables in said floor, triangular-sided, peak-shaped members removably fastened to said floor, above said tables, said triangular-sided, peak-shaped members being open at one side and said open sides being sharp.

8. A riffle or classifier comprising a receiving pan, baffles situated in said pan, a floor above said pan, depressed tables in said floor, openings in said floor communicating with said tables and said pan, a series of rows of triangular-sided, peak-shaped members open at their down stream side on said floor over said tables and traps, each of said rows being ranged in staggered relation to the adjacent row.

9. A riffle or classifier, comprising a receiving pan, baffles situated in said pan, a floor above said pan, depressed tables in said floor, openings in said floor communicating with said tables and said pan, a series of rows of triangular-sided, peak-shaped members open at their down stream side on said floor over said tables and traps, said members having cutting edges at their open ends, each of said rows being ranged in staggered relation to the adjacent row.

10. In a riffle, having a floor, a plurality of rows of triangular sided peaked members open at their downstream side, each of said rows being offset with relation to the adjoining rows, a series of depressed tables under said peaked members and traps under each peaked member.

JOHN F. GUEST.